Nov. 10, 1942.    G. G. WITTWER ET AL    2,301,601
DISH WASHING APPARATUS
Filed July 19, 1938    2 Sheets-Sheet 1

INVENTORS
George G. Wittwer
Ernest D. Wilson
BY
Sanger Kennedy Hermann & Hazell
ATTORNEYS

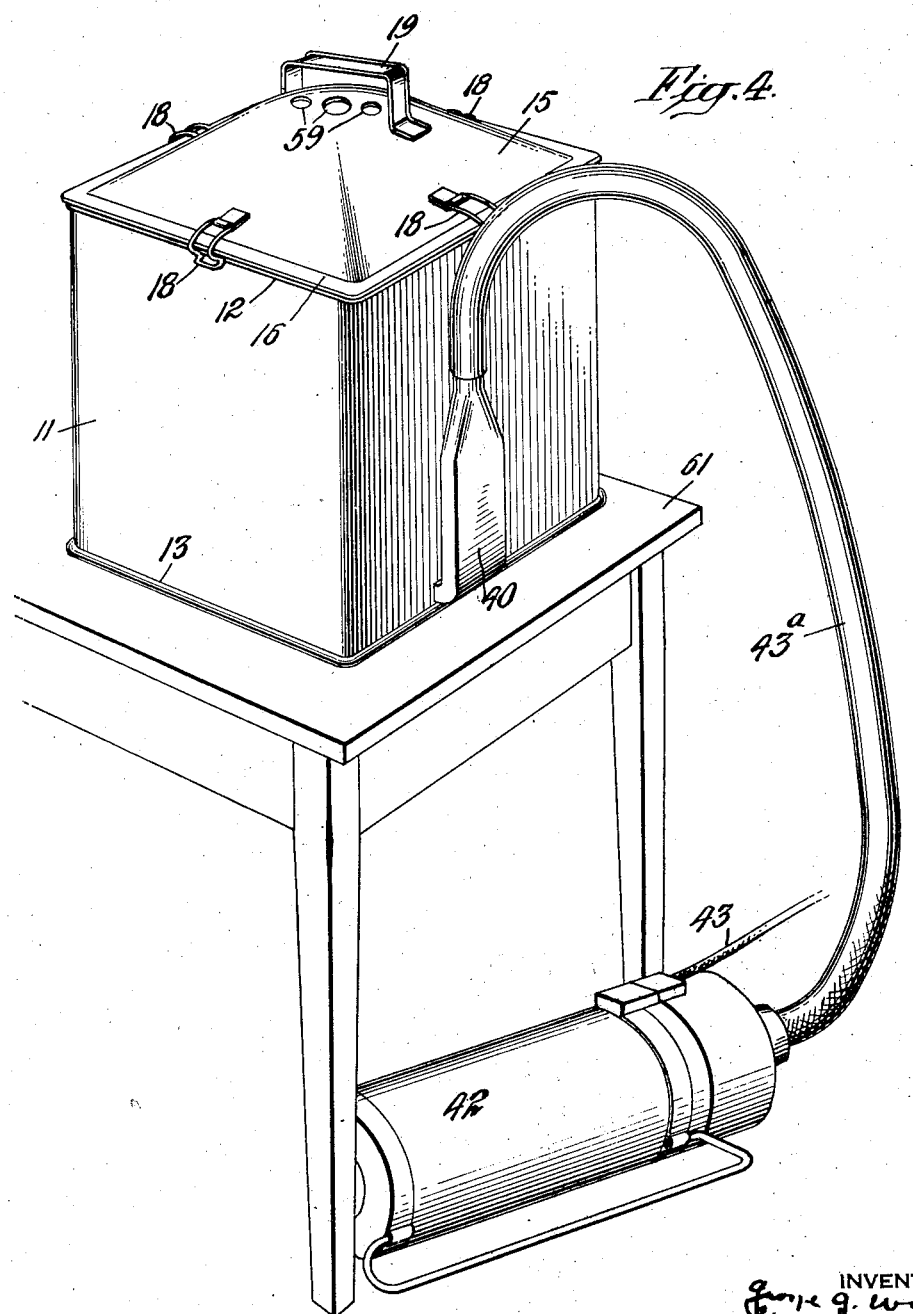

Patented Nov. 10, 1942

2,301,601

UNITED STATES PATENT OFFICE 2,301,601

DISH WASHING APPARATUS

George G. Wittwer, Chappaqua, and Ernest D. Wilson, Larchmont, N. Y., assignors to W-B Chemical Company, Inc., Mount Vernon, N. Y., a corporation of New York Application July 19, 1938, Serial No. 219,942

4 Claims. (Cl. 141—9)

This invention relates to dish washing apparatus.

Dish washing machines as heretofore known are relatively expensive and are ordinarily of such character that they require a "built-in" location in the kitchen.

It is one of the principal objects of the present invention to provide dish washing apparatus that can be used in practically any desired location and that can be produced so economically as to make it available for the average household.

It is a further object of the invention to provide apparatus for washing dishes such that even the dirtiest dishes can be readily and thoroughly cleaned in a short time.

With these and other objects in view, the invention consists in the features, combinations, details of construction and arrangements of parts which will first be described in connection with the accompanying drawings and then more particularly pointed out.

In the drawings:

Figure 4 is a perspective view of the apparatus in a position for use.

Figure 2:
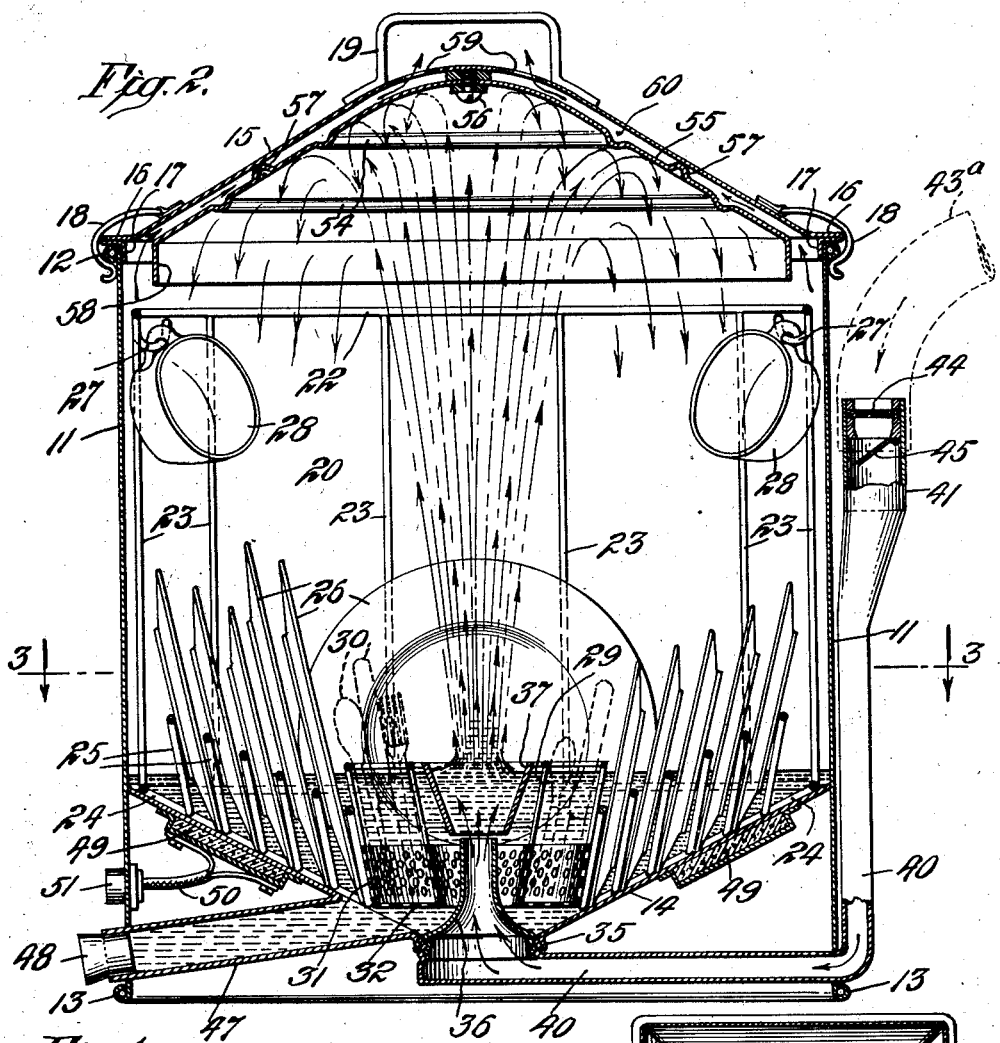
Figure 2 is a sectional view (enlarged) taken on the line 2—2 of Figure 1.
Figure 1:
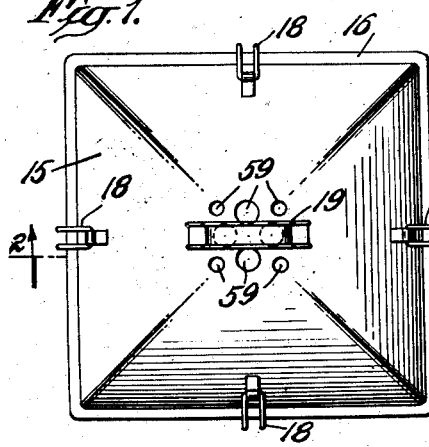
Figure 1 is a top plan view of a dish washing apparatus constructed in accordance with the invention.
Figure 3:
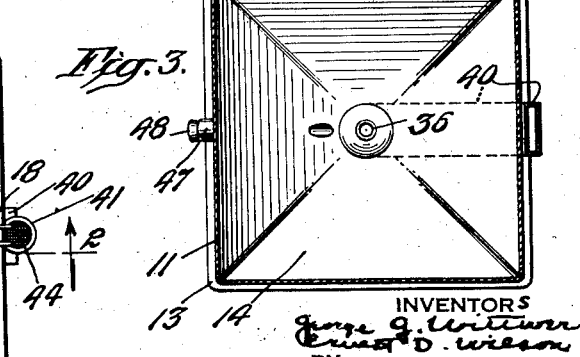
Figure 3 is a sectional view (reduced) taken on the line 3—3 of Figure 2, with dishes and racks removed.

Referring to the drawings, the apparatus of the present invention includes a container enclosing a dish-washing chamber. In the embodiment of the invention here illustrated as an example, the container comprises an open-ended tank 11, rectangular in cross-section, and having beaded top and bottom edges 12, 13. The bottom bead 13 serves as a foot for supporting the apparatus on a table, sink, floor or the like. Secured in the lower portion of the tank 11 in any suitable manner is a funnel-shaped bottom 14.

The container has a removable cover. As here shown as an example, the cover 15 is dome-shaped and has a lip 16 which seats on the upper beaded edge 12 of the tank 11. Extending downward from the cover lip is a centering flange 17 which fits inside the mouth of the tank. On the cover are a plurality of spring catches 18 which snap under the bead 12 to latch the cover in place. At the top of the cover is a handle 19 by which the cover or the entire container may be moved about. The tank 11, bottom piece 14 and cover 15 enclose a dish washing chamber 20.

There is provided means for supporting various types of dishes and utensils in the washing chamber. As here shown as an example, removably seated on the funnel-shaped bottom 14 is a supporting rack formed of wire stock and comprising a top ring 22, uprights 23, a base 24 and a series of parallel supports 25. These latter serve to position plates 26, saucers and the like, in the manner illustrated in Figure 2. On the rack uprights 23 are hooks 27 for cups 28. Inside the parallel supports 25 is an annular, conical receptacle 29 for tableware 30 and similar utensils. This receptacle is formed of wire stock, the lower part having sides 31 and bottom 32 of perforated sheet metal to support the utensils. The dish rack and the utensil receptacle may be separate elements or may be formed as a unit. It will be apparent that other forms and types of racks and supports may be used. In any event, however, the supporting means should be so constructed and the dishes and utensils so arranged thereon and therein that there is a substantially unobstructed vertical space upwardly from the lower part of the chamber, as in Figure 2, for a purpose hereinafter referred to.

The invention in its entirety includes means for causing a spray to be circulated through the washing chamber. This may conveniently be accomplished by injecting a stream or current of air under pressure upwardly in the vertical space above referred to, such stream or current of air causing the cleansing liquid to be broken up into the form of a spray, as hereinafter more fully described.

In the embodiment here illustrated as an example, at the bottom of the funnel formed by bottom piece 14 is a thimble 35 into which is removably threaded a nozzle element 36 which may be referred to as the lower nozzle. As here shown as an example, lower nozzle 36 is substantially cylindrical at its upper part, curving outwardly and downwardly to a base of greater diameter. Associated with this lower nozzle 36 is a supplemental nozzle element 37 which, for convenience, may be termed the upper nozzle. This upper nozzle element 37 is in the form of an inverted frustum of a cone. As appears in Figure 2, the lower mouth of upper nozzle 37 if of greater diameter than the upper mouth of lower nozzle 36. As also appears in Figure 2, the upper nozzle is so positioned that the bottom of the upper nozzle 37 is substantially level with or very slightly above the top of the lower nozzle 36. While the upper nozzle may be supported in this relation in various ways, a convenient method, as here shown, is to construct upper nozzle 37 as a unitary part of the utensil receptacle. In this manner, the upper nozzle is automatically positioned upon insertion of the receptacle and is ipso facto removed for cleaning purposes upon removal of the receptacle.

There is provided means for connecting the lower nozzle with a source of air under pressure. To this end, as here shown as an example, thimble 35 is formed as the end of a conduit or pipe 40 which passes through a hole in the side of tank 11 and extends upwardly outside the container, terminating in a coupling 41. While the conduit 40 may be connected to any suitable source of air under pressure, a convenient source, and one for which the apparatus is particularly adapted, is the blower or outlet side of a so-called portable vacuum cleaner. A cleaner of known and suitable type is illustrated more or less conventionally at 42 in Figure 4 but it is to be understood that other types of cleaners may be used. Cleaner 42, as will be understood, includes a fan or impeller and an electric motor, and has a conductor cord 43 for connection with a wall socket or the like. The outlet or blower side of cleaner 42 is connected with conduit 40 by a hose 43a, the end of which takes over coupling 41. When the cleaner fan or impeller is rotated by the motor, air is drawn into the cleaner and forced out through the blower side under pressure. It follows that when the cleaner is connected, as described, with conduit 40, air under pressure is delivered to nozzle 36.

In coupling 41 is a filter screen 44 for filtering the air coming from the cleaner to remove any particles of dust and dirt that might be carried from the cleaner. If the cleaner is of the type having a built in filter, screen 44 may be omitted. Also in coupling 41 is a flap valve 45 for preventing any flow of water into the cleaner should the hose be connected, by error, with the suction side.

At the bottom of the container is a drain pipe 47 normally closed by a plug 48. It is to be understood that the container may have any other suitable means for drawing off dirty water.

The invention in its entirety includes means whereby water or air in the washing chamber may be heated. To this end, as here shown as an example, secured to the lower side of the funnel-shaped bottom piece 14 is an electric resistance heating element 49 of any suitable construction. The resistors are connected by cable 50 to a terminal socket 51 for connection by cord or otherwise to a wall plug or other source of electric current.

As later described in more detail, the air forced into chamber 20 causes a column of spray to be forced upwardly through the center of the chamber. The invention in its entirety includes means for spreading this spray and deflecting it downwardly in what may be termed an umbrella-shaped formation. This may be conveniently accomplished by a dome-shaped deflector in the upper part of the chamber. In structures embodying the invention to what is now considered the best advantage, the deflecting surface will be part of the cover unit in order that removal of the cover ipso facto removes the deflector to give access to the chamber. Under some circumstances, the inner wall of the cover element 15 might be utilized as a deflector. But for reasons hereinafter explained, we prefer to provide a composite cover unit having a separate but connected deflector plate.

To this end, as here shown as an example, the cover unit is double walled with a space between. Inside the cover element 15 is a deflector unit in the form of a plate 55 generally paralleling the domed shape of the former. Deflector plate 55 is removably secured to cover element 15 by a bolt 56 and is spaced therefrom by nibs 57 struck up from the metal of plate 55. The dome-shaped deflector plate has a number of internal beads or ridges 54 and terminates in a downwardly extending skirt or apron 58.

There is provided means for venting air delivered to the washing chamber, to prevent a building up of excess pressure. To this end, as here shown as an example, formed in the top of cover element 15 are a number of vent holes 59. The space 60 between the two walls of the composite cover, that is, the space between the cover element 15 and the deflector plate 55, serves as a channel by which vent holes 59 are in communication with chamber 20. Excess air passes up through this channel 60 and vents via ports 59, without any substantial escape of the washing liquid.

To use the apparatus described, the container is placed on a table 61 or in any other desired location, for example, on a sink. With the cover removed, tank 11 presents a wide mouth for the insertion of the dishes to be washed. The dish rack and the utensil receptacle having been placed in the lower part of the chamber, dirty plates and other dishes are inserted in the rack, cups are hung on hooks 27 and tableware and similar utensils are placed in the receptacle, all in substantially the manner illustrated in Figure 2.

While the washing medium may be water only, in carrying out the invention to what is now considered the best advantage, and particularly in the case of greasy dishes, there should be added to the water a detergent material of a non-foaming type. The use of soap or other foaming detergents is not recommended because the air that is forced in would quickly create a mass of suds that would tend to prevent proper functioning of the apparatus. Various non-foaming detergents are known in the cleaning art. For convenience of description, the cleansing medium is here referred to as water, it being understood that the water may contain a detergent.

Either before or after the dishes and utensils are inserted, a relatively small amount of water is placed in the container, that is, an amount such that the initial water level is only a slight distance above the bottom of the washing chamber, about as indicated in Figure 2. This initial water level, however, must be high enough to cover the mouth of lower nozzle 36. The water may be supplied in any suitable manner, e. g. direct from a tap, by a hose or by a pail or the like. For proper washing, the water should be hot. If no source of hot water is available, the heater 49 may be turned on until cold water is properly heated.

It will be apparent that when the water is first supplied, it will enter nozzle 36 and conduit 40 as it seeks its level. To simplify the illustration, however, Figure 2 shows nozzle and conduit without water therein. Conduit 40 extends far enough up the side of the container to have coupling 41 well above the water level.

The water and the articles to be washed having been inserted, the cover 15 is latched in place, thus sealing washing chamber 20 except for the air vents 59. The supply of air under pressure is now turned on as, for example, by connecting hose 43ᵃ to the blower side of a vacuum cleaner and starting the cleaner motor.

It will be apparent that the force of the air will displace at least part of the water in the conduit and nozzle but for the purposes of the present description any water remaining in or re-entering the nozzle may be considered as part of the water content of the container. As appears in Figure 2, the upper end of nozzle 36 is smaller in cross-sectional area than conduit 40 and smaller than the adjacent mouth of upper nozzle 37. With this arrangement and with the relation of lower and upper nozzles previously described, a kind of injector action is obtained, as a result of which a column or stream of air is forced up through the water and upwardly through the central open space of the chamber vertically alined with the nozzle. By virtue of this air stream and by virtue of the fact that the layer of water above nozzle 36 is relatively shallow, the water is broken up into a spray or mist which is carried upwardly with the air. As this column of air and spray rises, it tends to spread out and would, if the chamber were high enough, eventually fall back by gravity. The present apparatus, however, is so constructed and arranged as to control the column of spray more positively. That is, the dome-shaped deflector plate 55, being in the path of the column of spray, causes the spray to be spread out and deflected downward in what may be termed an umbrella-shaped formation, in some such manner as is illustrated by the arrows in Figure 2. Thus, the spray falls back over substantially the entire cross-sectional area of chamber 20 and passes over the various surfaces of the articles to be washed. The beads or ridges 54 aid in directing and deflecting the spray and may be positioned as necessary to obtain the desired results.

As soon as the air flow and the formation of spray are initiated, the water level at the bottom drops to a greater or less extent, thus exposing more surface of the dishes in the rack. The falling spray joins the remaining volume of water and the repeating cycles result in what amounts to a substantially continuous circulation of spray or mist throughout the washing chamber, penetrating to all parts of the articles to be washed. It has been found that with the apparatus described, even the most dirty and greasy of dishes can be thoroughly cleansed in from three to five minutes.

During the washing operation there is substantially no build up of pressure because air is vented via channel 60 and ports 59.

The upper nozzle or cone 37 aids in directing the spray directly upward and in preventing any tendency of the spray column to oscillate. While, under certain conditions, this upper nozzle 37 may be omitted, its use is recommended for optimum results. Different lower nozzles may be substituted for nozzle 36, depending on the character of the source of air pressure used. For example, the lower the pressure of the delivered air, the smaller should be the mouth of the lower nozzle.

Following the requisite cleansing period, the air supply is shut off as, for example, by turning off the cleaner motor. The spray at once subsides and the dirty water may be drained off via pipe 47.

The dishes and other articles may then be rinsed in various ways. It has been found, for example, that by leaving drain 47 open and spraying the dishes with hot water, by means of a hand spray and hose from a tap, the dishes, etc. are properly rinsed and dry bright and clean without wiping. Or clean water may be inserted and the air supply turned on again, thus giving the dishes a circulation of clean spray for rinsing.

If desired, the apparatus may be used for drying. To this end, after rinsing and draining, the heater may be turned on and the air supply turned on without water present. This serves to give the dishes a circulation of warm air for drying.

The dish washer above described is inexpensive to manufacture. It can be used in almost any location, requires no "built-in" space and can be stored away anywhere when not in use. It is of particular advantage in households where a vacuum cleaner is available as the air supply is thus obtained without additional cost. The apparatus and its method of operation have beneficial and advantageous results even disregarding the elements of simplicity and economy. The use of a circulating spray as compared, for example, with the use of a circulation of liquid, makes it possible to obtain better cleansing action in less time.

It is to be understood that the invention in its broader aspects is not limited to any particular source of air pressure. While the use of a vacuum cleaner makes for a convenient source, it is to be understood that a motor and blower unit can be incorporated as a unitary part of the apparatus. Such an embodiment, while in itself more expensive to manufacture, still retains the advantages of mobility and improved cleansing action.

A further advantage of the apparatus described as shown is that it lends it self to thorough cleaning. The rack and utensil receptacle are removable simply by lifting out, the upper nozzle 37 being removed thereby. Lower nozzle 36 may be removed by unscrewing the same from its thimble. With the parts so removed, there are practically no crevices or the like that are inaccessible to cleaning. Upon removal of bolt 56, the two part cover unit may be taken apart for cleaning.

What is claimed is:

1. In dish washing apparatus, and in combination, a container enclosing a washing chamber and having an open upper end, means for supporting dishes therein, a removable dome-shaped cover for the open end of said container, and means for causing a circulation of spray through said chamber from a body of liquid in the lower part of said chamber, said last named means comprising a nozzle in the lower part of said chamber, means for connecting said nozzle with a source of air under pressure, and a paralleling dome-shaped deflector plate secured to and spaced from said cover, said cover having a vent hole opening from the space between the cover and said deflector plate, said deflector plate having a plurality of spray-deflecting beads or ridges, said chamber having an open, unobstructed space vertically upward from said nozzle to said deflector plate.

2. In dish washing apparatus, and in combination, a container enclosing a washing chamber, means for supporting dishes therein, and means for causing a circulation of spray through said chamber from a body of liquid in the lower part of said chamber, said last named means comprising a nozzle in the lower part of said chamber, a supplemental nozzle element in the form of an inverted frustum of a cone above said nozzle, the lower mouth of said cone being of greater diameter than the mouth of said nozzle and being located about at a level therewith and means for connecting said nozzle with a source of air under pressure, said chamber having an open, unobstructed space vertically upward from said nozzle elements to a point above the supported dishes.

3. In dish washing apparatus, and in combination, a container enclosing a washing chamber, means for supporting dishes therein, and means for causing a circulation of spray or mist throughout said chamber from a body of liquid in the lower part of said chamber, said last named means comprising a lower nozzle element, an upper nozzle element in the form of an inverted frustum of a cone, and a conduit connected with the lower end of the lower nozzle element for connection with a source of air under pressure, the upper end of said lower nozzle element being smaller than the cross-sectional area of said conduit and smaller than the adjacent mouth of the upper nozzle element, the lower mouth of the upper nozzle element being about at a level with the upper mouth of the lower nozzle element, said chamber having an open, unobstructed space vertically upward from said nozzle elements to a point above the supported dishes.

4. In dish washing apparatus, and in combination, a container enclosing a washing chamber and having a sloping bottom, a removable rack for dishes supportable on said sloping bottom and so arranged as to leave an open, unobstructed vertical space centrally of the washing chamber, a conduit located below said sloping bottom and leading to a point outside the container for connection with a source of air under pressure, a nozzle element connected with said conduit and opening into the washing chamber, a removable annular receptacle for containing articles to be washed located concentrically of said nozzle element, and a supplemental nozzle element in the form of an inverted frustum of a cone carried by said receptacle, the lower mouth of said supplemental nozzle element being about at a level with the upper mouth of said first-named nozzle element when said receptacle is in washing position in the chamber.

GEORGE G. WITTWER.
ERNEST D. WILSON.